United States Patent Office 3,363,727
Patented Jan. 16, 1968

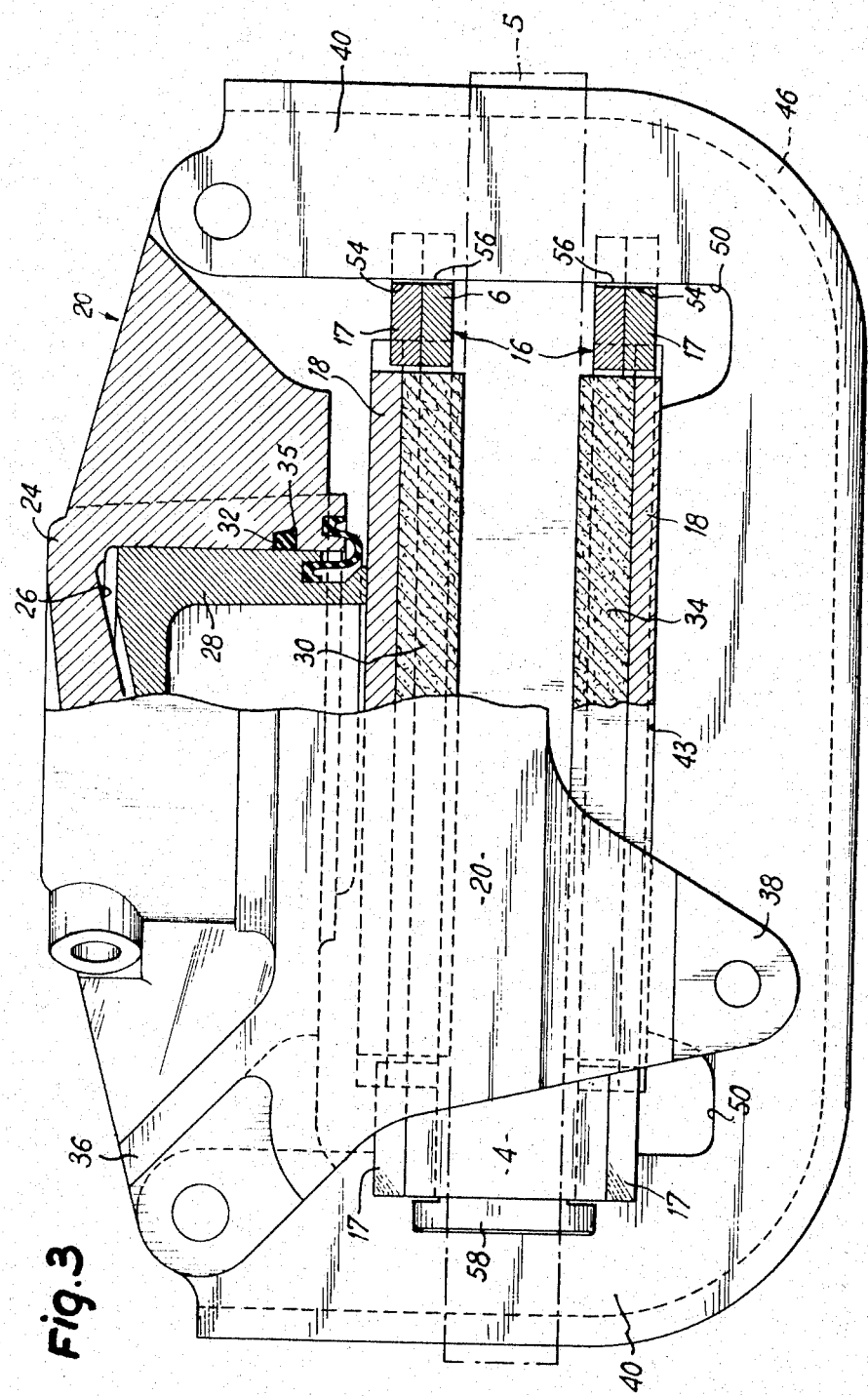

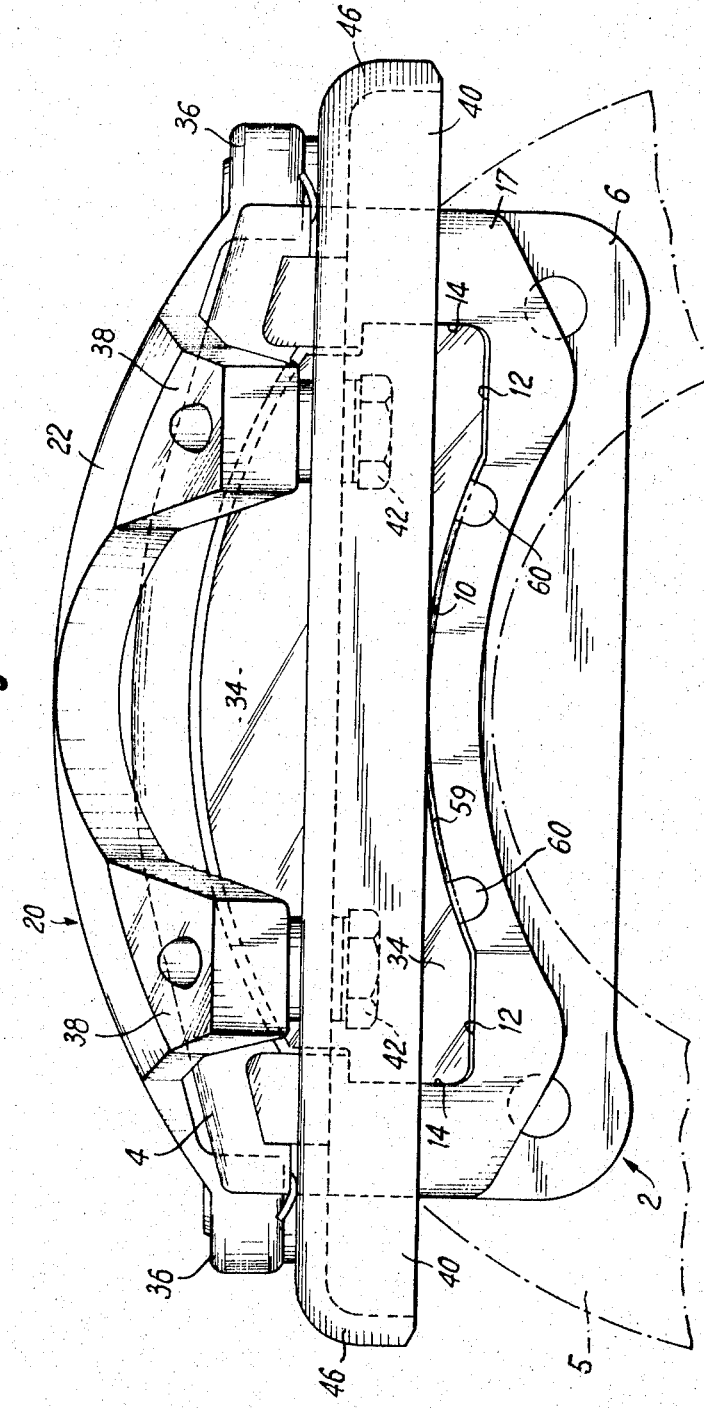

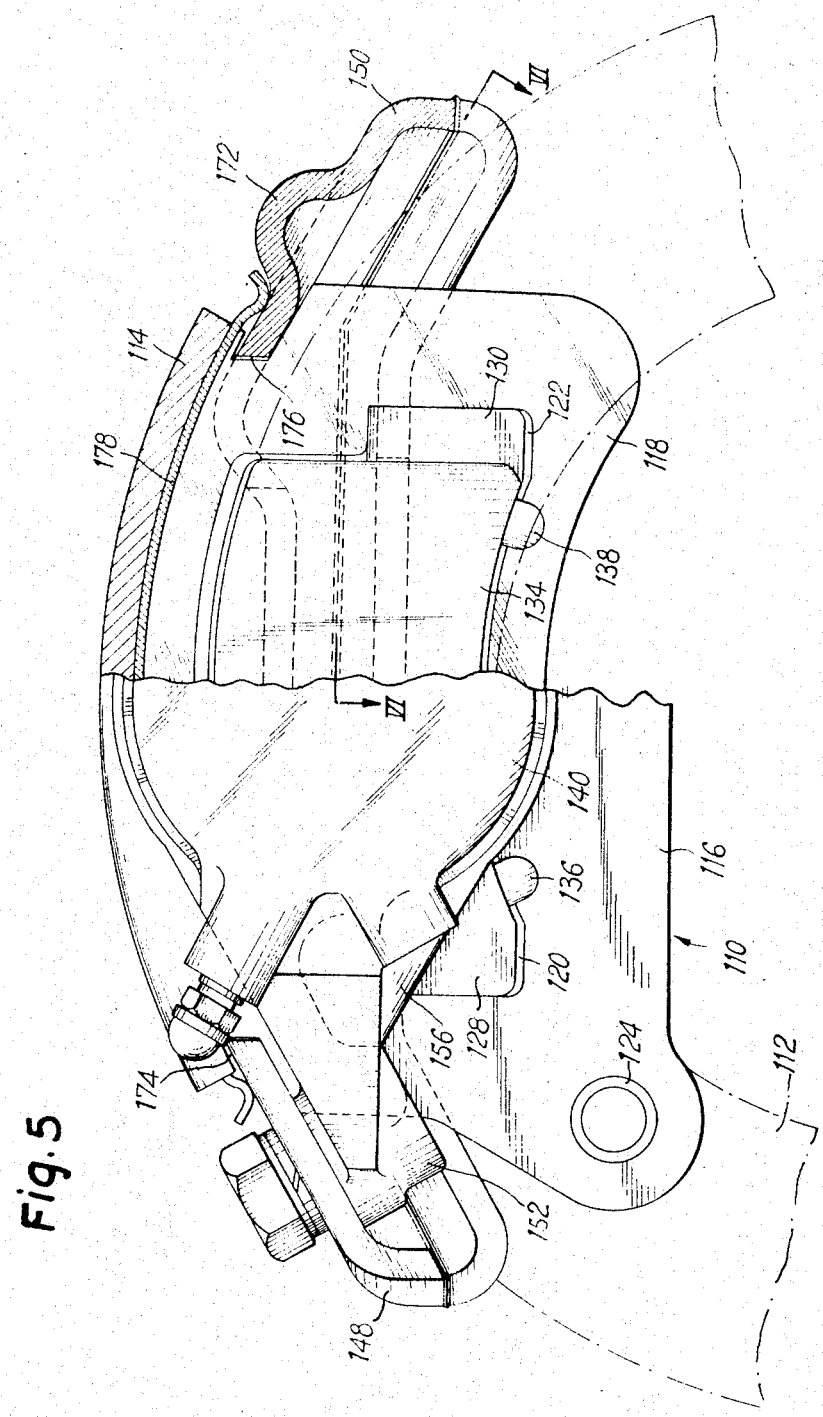

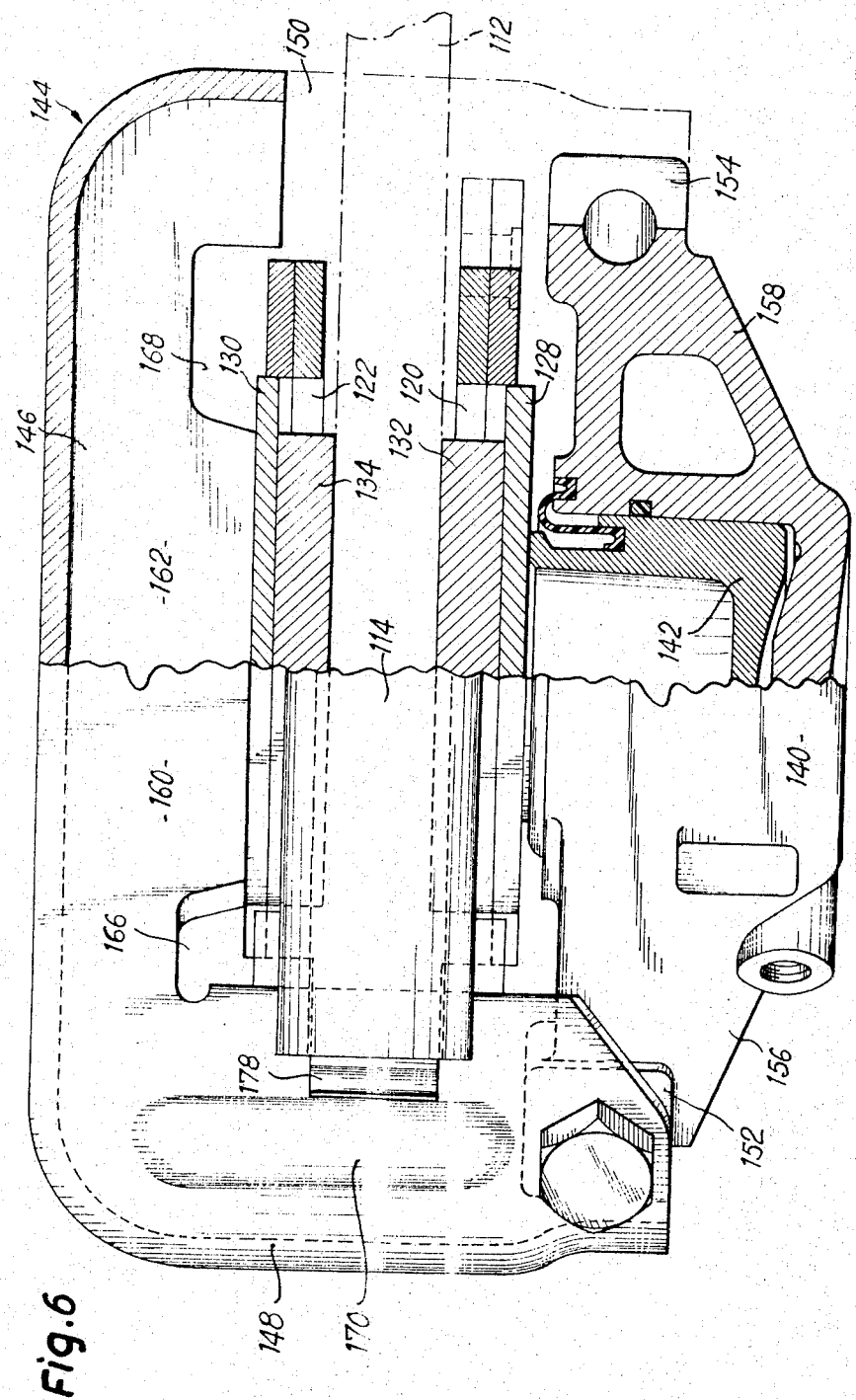

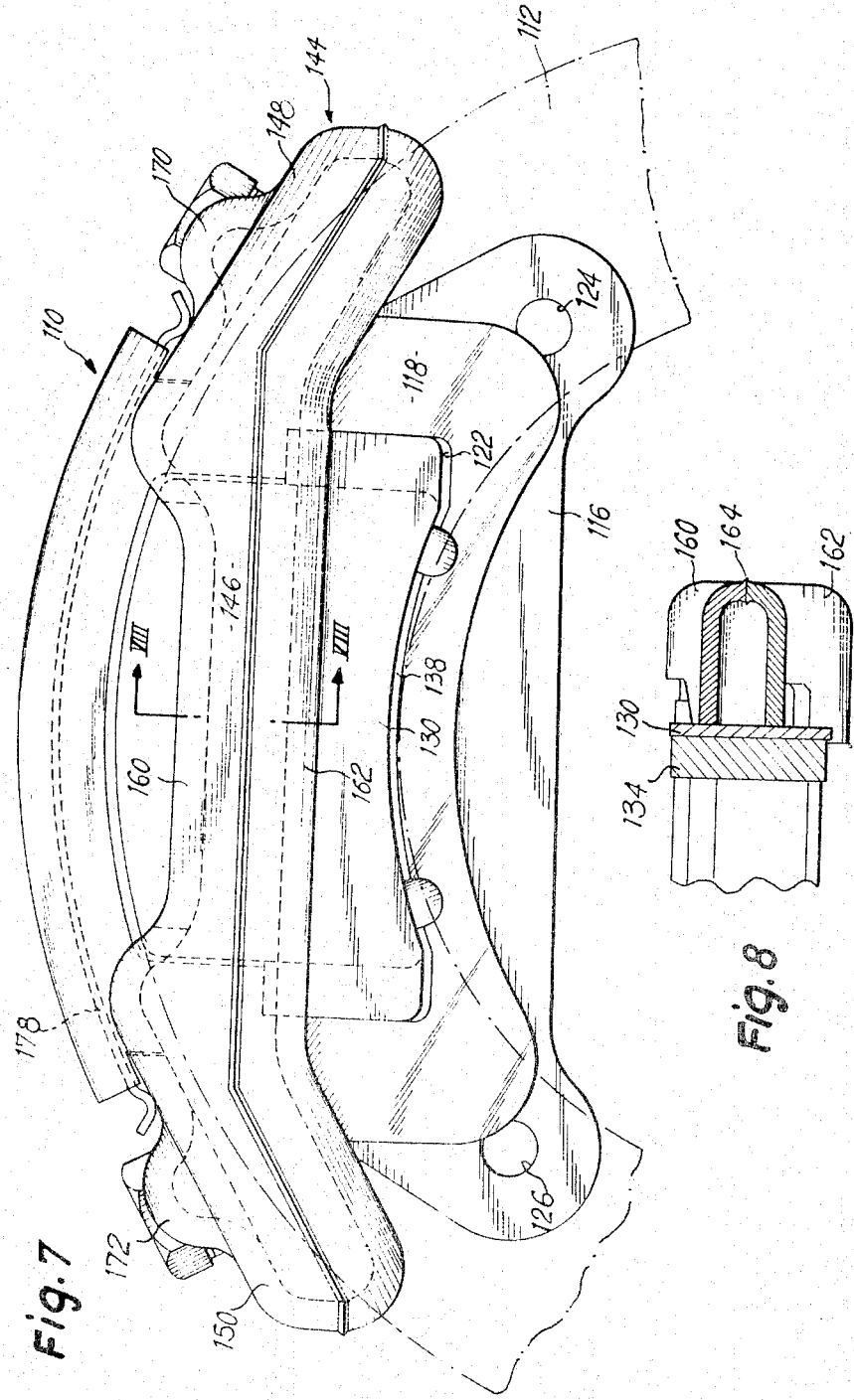

3,363,727
CLOSED-LOOP TYPE DISC BRAKE
René Thirion, Paris, France, assignor to
Societe Anonyme D.B.A.
Filed Nov. 17, 1966, Ser. No. 595,240
Claims priority, application France, Nov. 18, 1965,
38,846; Jan. 29, 1966, 47,706
14 Claims. (Cl. 188—73)

This invention relates to a disc brake, and more particularly to a disc brake of the floating frame type with a U-shaped fixed support stradding the disc to be braked, said fixed support comprising two limbs each of which is provided with an opening for slidably receiving one of the friction pads, and a closed loop structure being slidably mounted for axial movement with respect to the fixed support for urging the friction pads into engagement with the respective faces of the disc upon brake actuation.

An object of the present invention is to provide a disc brake of the type referred to above which is compact in size and yet offers an increased braking capacity over known prior art embodiments.

A more specific object of the invention is to provide an improved construction of the fixed support, by which the latter is conferred a better resistance with respect to opening and twisting strains arising upon braking.

Still another object of the invention is to provide an improved construction of the floating frame, by which the latter is made both lighter and more rigid thanks to the use of adequately designed stampings.

According to an essential feature of the invention, there is provided a disc brake of the type referred to above which comprises a U-shaped fixed support with two limbs extending adjacent the respective faces of the disc to be braked and connected to each other by a solid peripheral portion, two friction pads slidably received in facing openings of the respective fixed support limbs, and a closed loop structure slidably guided for axial movement on the fixed support and including an actuator on one side of the disc adapted to bring the adjacent friction pad into engagement with the corresponding disc face and a rigid frame extending beyond the disc for bringing the other friction pad into engagement with the opposite face thereof, each of said openings being limited by two radially spaced arcuate portions of the fixed support limb and by two circumferentially spaced lateral portions connecting said arcuate portions to each other, and each of said lateral portions being provided with a slot at its outer edge near the top thereof for slidably guiding said rigid frame when moving parallel to the disc axis.

Other features and advantages of the invention will become apparent from the following description of some embodiments thereof, given only by way of example with reference to the accompanying drawing, in which:

FIGURE 3 is an upper view partly in cross section along a plane containing the actuator axis, of the brake of FIGURE 1.

FIGURE 4 is an elevational view of the same brake, as seen from the frame side.

FIGURE 5 is an elevational view, similar to that of FIGURE 1, but relating to a further embodiment of the invention.

FIGURE 6 is an upper view, partly in section along line VI—VI of FIGURE 5, of said further embodiment.

FIGURE 7 is an elevational view, similar to that of FIGURE 4, of said further embodiment.

FIGURE 8 is a partial section view taken along line VIII—VIII of FIGURE 7.

Figure 1:
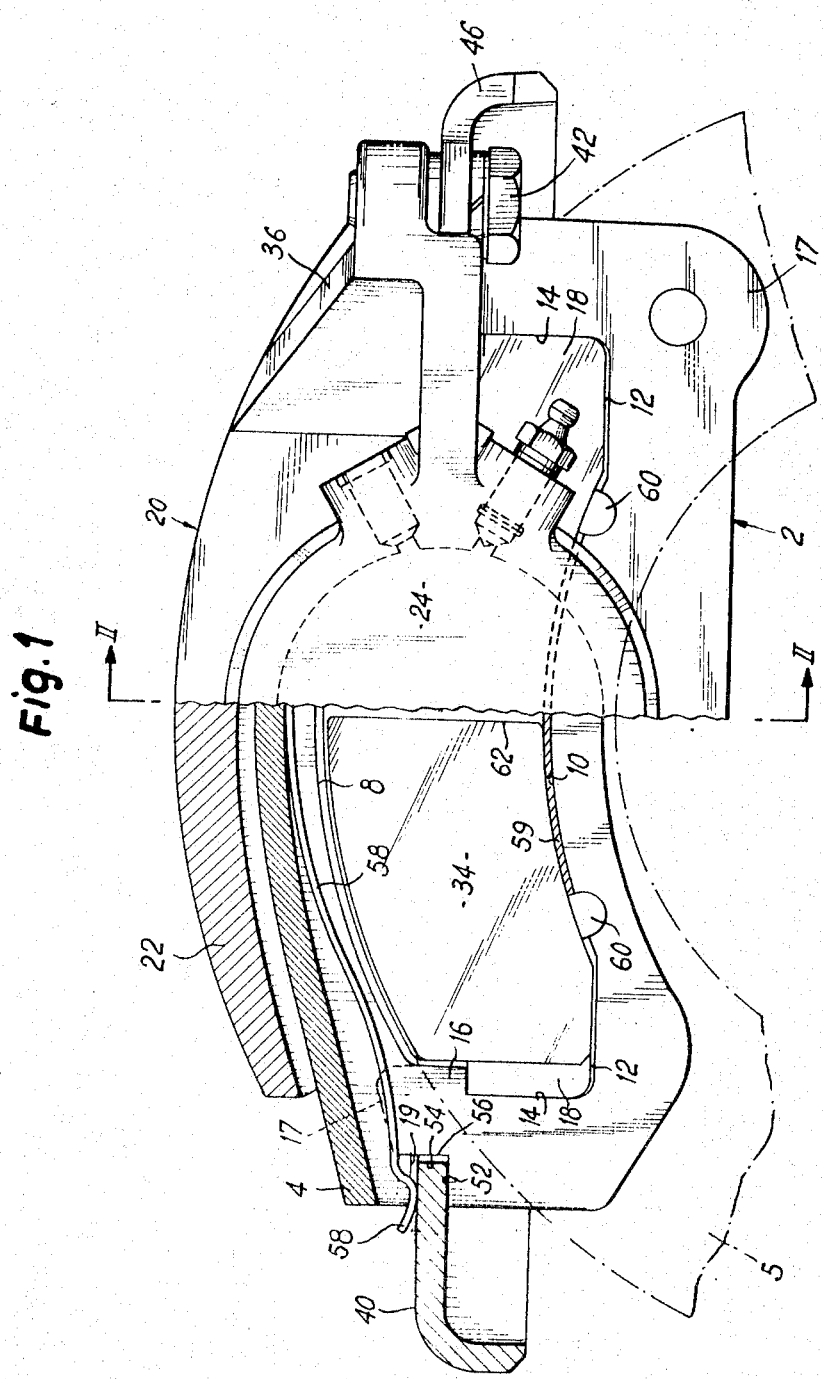
FIGURE 1 is an elevational view, partly in cross section along the plane of the disc, of a first embodiment of the invention, the brake being shown as seen from the actuator side.

Referring to FIGURES 1 to 4 of the drawings, there is shown a brake comprising a U-shaped fixed support 2 with a solid peripheral portion 4 connecting two parallel limbs each of which extends adjacent a respective face of the rotatable axially fixed disc 5 to be braked. One of said limbs 6 is provided with two conventional holes through which extend the screws or bolts securing the fixed support of the brake to a suitable stationary element of the vehicle. The solid peripheral portion 4 extends over the whole length of the fixed support, which substantially increases the resistance of the latter to the strains arising upon braking and thus enables the floating frame type brake to be used for heavy or sport vehicles. The limbs of the fixed support are provided with two identical facing openings 8 each of which is limited by two radially spaced arcuate portions of the limb and by two circumferentially spaced, substantially straight lateral portions connecting said arcuate portions to each other. The base arcuate portion 10 may be formed with a circular shape so as to conform with the hub of the wheel, and is connected to the lateral portions of the limb by two rectilinear extensions 12. A generally rectangular slot 14 is provided at the base of the inner edge of each lateral portion of the limb for purposes to be explained hereinafter, and is limited by the top 16 thereof. The top arcuate portion of the limb may have its inner edge shaped circular with a radius of curvature substantially the same as, or by a small amount greater than that of the disc 5. The solid peripheral portion 4 of the fixed support advantageously may be given a substantially greater radius, so that the height of the top arcuate portion progressively increases from the middle thereof toward both ends thereof, thus contributing to increase the resistance of the fixed support with respect to the strains arising upon brake actuation.

Reinforcing plates 17, the inner edges of which register with those of the fixed support limbs, are affixed to said limbs, preferably by welding, so as to increase the stiffness of the fixed support and to allow for an efficient guiding of the friction pads which are disposed on either sides of the disc and which regardless of the degree of wear of their linings, will only anchor on the fixed support through the intermediary of metal backing plates 18 carrying said linings. In the embodiment shown in the drawings, the reinforcing plates 17 extend on both lateral portions and on the base arcuate portion of each limb, and they are welded to the respective outer faces thereof.

Rectangular slots 19 are further provided at the outer edges of both the lateral portions of each fixed support limb and the respective reinforcing plate, near the top thereof, for purposes to be set forth hereinafter.

The movable assembly 20 of the brake consists of a closed loop structure including a moulded stirrup 22 having a hydraulic cylinder 24 arranged on one side of the disc; this cylinder is formed with a bore 26 and slidably receives a piston 28 adapted to actuate the adjacent friction pad 30 which in turn is slidably received in the opening 8 of the corresponding fixed support limb 6. Sealing between the cylinder 26 and the piston 28, and protection against entrance of contaminants into the hydraulic actuator are obtained by conventional means, such as a rubber seal 32 engaging a groove 35 of a trapezoidal cross-section, and a flexible annular boot the peripheral beads of which are received in grooves provided in the cylinder and piston respectively.

The stirrup 22 has two opposite lateral projections 36 extending substantially parallel to the face of the disc, and further has a peripheral portion which straddles the peripheral portions of the fixed support and terminates by two other spaced projections 38 extending substantially parallel to the opposite face of the disc. These four projections, preferably made integral with the stirrup, terminate in a common plane substantially containing the axis of the cylinder bore 26, and are used to secure to the stirrup 22 a rigid C-shaped frame 40 which preferably consists of a stamping and which completes the closed loop structure of the brake. Said frame comprises a chordal portion extending parallel to the disc and formed with a rectilinear inner edge 43 for abutting the adjacent friction pad 34, and two lateral branches extending parallel to the disc axis; said chordal portion and said lateral branches are secured, as by bolt connections 42, to the ends of projections 38 and 36 respectively. It should be understood that the closed loop structure consisting of the stirrup 22 with the hydraulic actuator contained therein and of the rigid frame 40 connected thereto, has only to resist the axial strains developed upon braking, while the tangential strains exerted on the friction pads are directly transmitted by the latters to the fixed support of the brake. In order to increase the stiffness of the frame 40, its outer edge 46 may be advantageously bent downwards along the periphery thereof at a substantially right angle towards the disc axis, as illustrated by the drawing. Since, however, the available space for mounting the brake inside the wheel of the vehicle is generally limited, it may be advisable to somewhat increase the radius of curvature of said outer edge 46 at the places of junction between the chordal portion and the lateral branches of the frame. Recesses 50 provided on either side of the rectilinear inner edge 43 allow for a free movement of the frame parallel to the disc axis despite the increase of stroke due to the wear of the linings.

The frame 40 is guided while moving parallel to the disc axis, by the slots 19 which, as already stated, are provided at the outer edges of both the lateral portions of the fixed support limbs and the respective reinforcing plates near the top thereof. Said slots are shaped rectangular, so that the base edges 52 thereof may be used as bearing surfaces for the respective lateral branches of the frame. The inner edges of said frame lateral branches are spaced from each other by a distance somewhat larger than that existing between the facing edges 56 of the slots 19, so that a predetermined lateral clearance be left between the frame and the guiding slots provided in the fixed support. An arcuate leaf spring 58 is inserted between the solid peripheral portion 4 of the fixed support and the lateral branches of the frame; the ends of this spring, which are preferably bent upwards, resiliently urge said lateral branches against their respective bearing surfaces 52 and thus prevent the frame from rattling.

A further leaf spring 59 may be inserted in the space left between the base arcuate portion 10 of each fixed support limb and the adjacent base edge of the corresponding friction pad, for similarly preventing the latter from any rattling inside the limb opening. The ends of said spring 59 are preferably formed with pairs of downwardly bent tongues 60 which straddle the base arcuate portion of the limb thus locking the spring in place.

The friction pads 30, 34 consist of metal backing plates 18, having a shape substantially the same as that of the openings 8 in the fixed support limbs, and of conventional friction linings affixed thereto. The backing plates have on either side thereof extensions fitting with the rectangular slots 14 and coacting with them for guiding and anchoring the pads with respect to the fixed support.

The linings do not cover the whole surface of the backing plates, since, as better shown in FIGURE 1, no lining is provided on the side extensions thereof as well as on a narrow circular zone adjacent the top edge of the pads. Furthermore, a middle slot 62 may be provided in the lining in order to reduce the deflection which could be caused by any overheating due to excessive braking.

Figure 2:
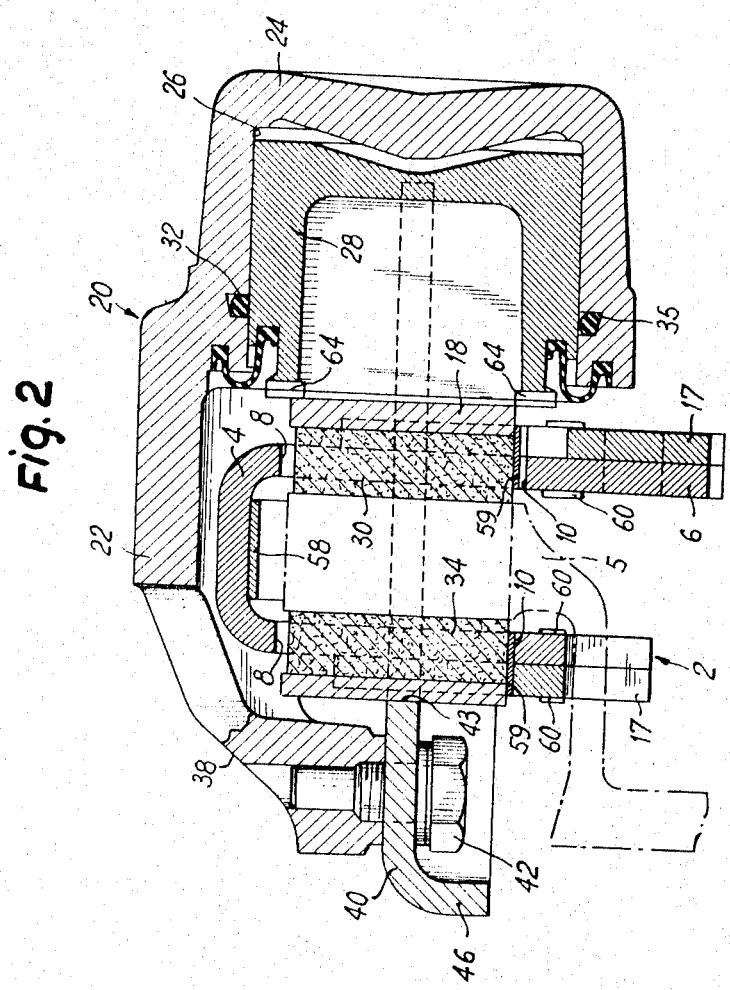
FIGURE 2 is a section view taken along the line II—II of FIGURE 1.

The working face of the piston 28 also may have a slot 64 in register with the axis of symmetry of the adjacent friction pad in order to better distribute the applying pressure exerted thereon. The bottom of the cylinder 24 may be made conical, as shown by FIGURE 2, in order to strengthen the stirrup 22 which the cylinder makes an integral part of; the corresponding face of the piston 28 must then be shaped accordingly.

The above described brake operates as follows:

Upon supplying pressurized fluid into the hydraulic actuator, the piston 28 first moves with respect to the cylinder and urges the adjacent friction pad 30 against the corresponding face of the disc; the reaction then exerted on the cylinder 24 causes both the latter and the frame 40 to move in the opposite direction, thus applying the friction pad 34 against the other face of the disc. The frame is slidably guided by the slots 19 provided in the fixed support, and has only to resist the axial strains resulting from brake actuation. Each of the friction pads anchors against one or the other of the lateral portions of the corresponding limb, depending upon the direction of disc rotation, and thus directly transmits to the fixed support the tangential strains to which it is subjected when being brought into engagement with the disc.

Referring now to FIGURES 5 to 8 of the drawings, there is shown another embodiment of the invention merely differing from the previous one by the construction of the movable assembly. The U-shaped fixed support 110 similarly comprises a solid peripheral portion 114 and two parallel limbs 116, 118 each of which is formed with an opening 120, 122 limited by two radially spaced arcuate portions and by two circumferentially spaced lateral portions of the limb. Generally rectangular slots are provided at the base of the inner edges of said lateral portions for guiding and anchoring the respective friction pads 128, 130 while moving parallel to the axis of the disc and being brought into engagement with the latter.

The movable assembly of the brake still consists of a closed loop structure including a hydraulic cylinder 140 and a rigid C-shaped frame 144 connected thereto. It should however be noted that the lateral branches 148, 150 of the frame are now inclined with respect to the chordal portion 146 thereof so as to substantially conform with the curvature of the periphery of the disc, as best shown by FIGURES 5 and 7. Preferably, the rigid C-shaped frame 144 consists of two complementary stampings 160, 162 adequately secured to each other. The first one 160, which comprises both a chordal portion and two complete lateral branches has its outer edge bent downwards along the periphery thereof substantially at right angle towards the disc axis. The second stamping 162 comprises a corresponding chordal portion, but its lateral branches are made substantially shorter than those of stamping 160 so that they do not extend over the periphery of the disc as shown by FIGURE 6; the outer edge of said stamping is bent upwards along the periphery thereof substantially at right angle, so that both stampings be symmetrically shaped to each other at least along the chordal portion thereof. Both stampings thus abut each other by their respective bent outer edges along the periphery of stamping 162 and they may be welded together, as shown in 164 by FIGURE 8, in order to provide for a rigid frame assembly. Alternatively the frame 144 could be made as a single stamping shaped substantially similar to said frame assembly.

The above described construction provides both for a light and very rigid frame since the chordal portion thereof, which has to resist the high bending strains resulting from brake actuation, is formed as a beam of U-shaped cross section. Consequently, the frame needs no longer be secured to the hydraulic actuator at points intermediate its ends and the straddling projections extending from the peripheral portion of the stirrup in the previous embodiment of FIGURES 1 to 4 may be dispensed with. A stirrup is no longer necessary and the cylinder 140 or, more generally speaking, the reaction element of the hydraulic actuator, may be formed with only two opposite lateral projections 156, 158 terminating with bosses 152, 154 substantially inclined in accordance with the lateral branches of the frame and securely connected to the ends of said lateral branches as by bolts or screws. The radial height of the brake is thus decreased and, since all elements of the frame are so designed as to be contained within a circle circumscribing the peripheral part of the fixed support, the overall dimensions of the brake are appreciably reduced over the previous embodiment. Inversely, for a given available space inside the wheel of the vehicle, the diameter of the disc may be increased thus resulting in improved braking capacity.

A further advantage of the above described construction is to be found in the fact that the chordal portion of the frame abuts the adjacent friction pad 130 with two parallel, substantially spaced surfaces (inner edges of both stampings 160, 162), thus providing for a better distribution of the applying pressure and insuring a more even wear of the lining 134. In order to prevent undesirable twisting strains from developing in the frame upon brake actuation, said abutting surfaces should be located symmetrically on either side of a plane substantially containing the axis of the hydraulic actuator, said plane also containing the points of the bosses 152, 154 at which the frame is secured to the cylinder projections. The lateral branches 148, 150 of the frame may be provided with reinforcing ribs 170, 172 directly made by stamping, so that they can better resist the bending strains to which they are likely to be subjected.

As a result from the profile of the frame, the guiding slots 174, 176 provided at the outer edges of both the lateral portions of the fixed support limbs and the respective reinforcing plates have to be formed with their base and top edges inclined in accordance with the lateral branches 148, 150 of the frame which they are intended to receive. As in the previous embodiment, the frame 144 is thus guided with a predetermined lateral clearance when moving axially with respect to the fixed support of the brake, and is further prevented from rattling by the arcuate leaf spring 178 inserted within the peripheral portion of said fixed support.

Figure 9:
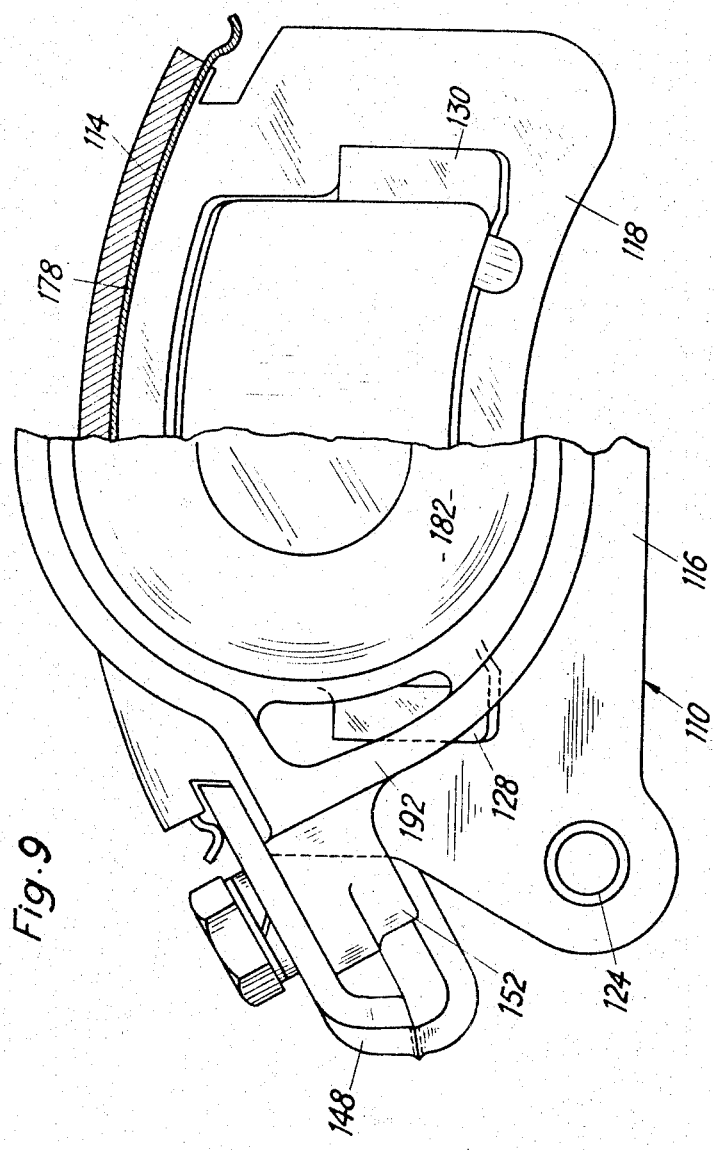
FIGURE 9 is an elevational view, similar to that of FIGURE 5, but relating to still a further embodiment of the invention.
Figure 10:
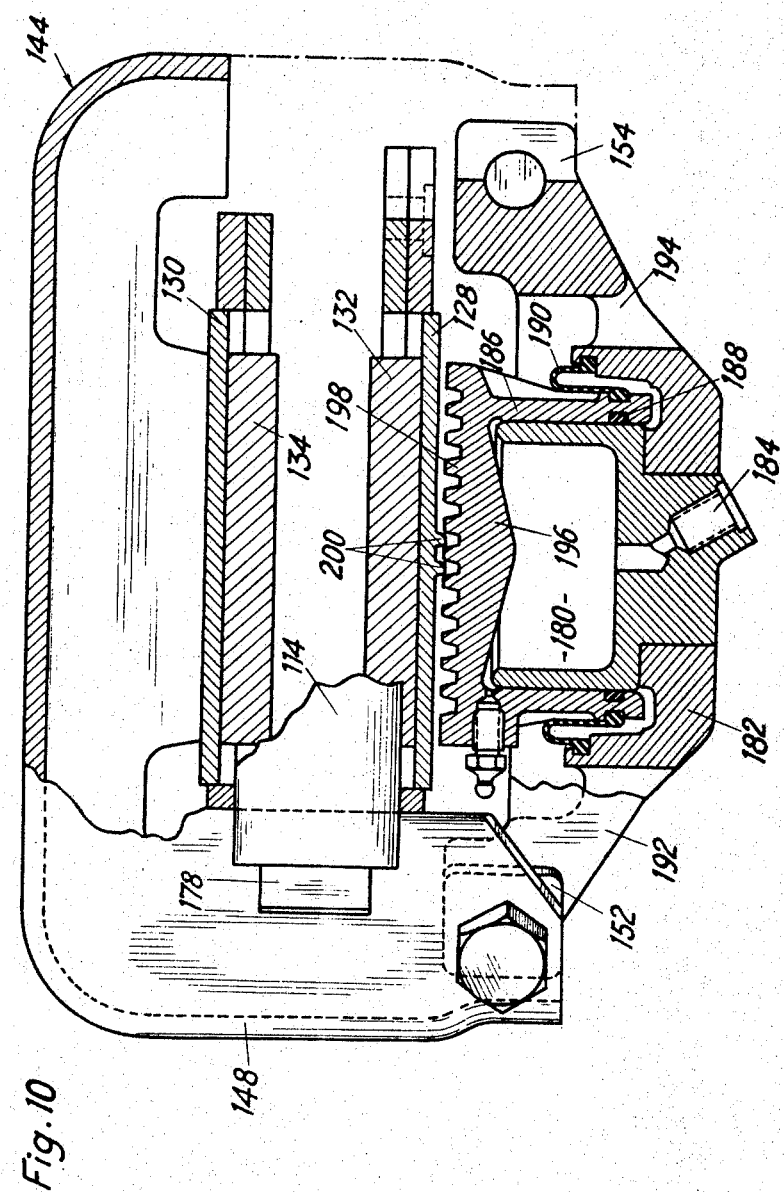
FIGURE 10 is a upper view, partly in cross section along a plane containing the actuator axis, of the brake shown by FIGURE 9.

FIGURES 9 and 10 of the drawings illustrate a further embodiment of the invention, merely differing from the preceding one by the substitution of the piston for the cylinder as the reaction element of the hydraulic actuator. After being machined, said piston 180 is press fitted into a suitable bore of said actuator 182, which latter is still provided with opposite lateral projections 192, 194 connecting it to the frame 144. The piston which is formed with an internal cavity communicating with the inlet port 184, cooperates with a sliding cylinder 186 which is adapted to urge the adjacent friction pad 128 against the corresponring face of the disc upon brake actuation. Sealing and protection against the entrance of contaminants are still obtained by a rubber seal 188 and a flexible annular boot 190 respectively. It should be understood that the mutual substitution of the two elements of the hydraulic actuator does in no way modify the operation of the brake.

The face 196 of the cylinder 186, which latter is preferably made by moulding, may be shaped in accordance with the profile of the lining 132 of the adjacent friction pad 128 which it is adapted to coact with; this feature provides for a better distribution of the face 196 further may be formed with a row of parallel ribs 198, which are obtained directly by moulding and which aim to contribute to a efficient cooling of the brake by creating a plurality of air ducts therebetween, as best shown by FIGURE 10. A pair of bosses 200 formed on the face of the backing plate of the pad 128 and fitting between corresponding ribs of the cylinder face prevent said cylinder from undesirable rotation about its axis.

We claim:

1. A disc brake of the floating frame type comprising a U-shaped fixed support with two limbs extending adjacent the respective faces of the disc to be braked and connected to each other by a solid peripheral portion, two friction pads slidably received in facing openings of the respective fixed support limbs, and a closed loop structure slidably guided for axial movement on the fixed support and including an actuator on one side of the disc adapted to bring the adjacent friction pad into engagement with the corresponding disc face and a rigid frame extending beyond the disc for bringing the other friction pad into engagement with the opposite face thereof, each of said openings being limited by two radially spaced arcuate portions of the fixed support limb and by two circumferentially spaced lateral portions connecting said arcuate portions to each other, and each of said lateral portions being provided with a slot at its outer edge near the top thereof for slidably guiding said rigid frame when moving parallel to the disc axis.

2. A disc brake according to claim 1, wherein each of said lateral portions is further provided with a slot at its inner edge near the base thereof for slidably guiding and anchoring a corresponding extension of the respective friction pad.

3. A disc brake according to claim 1, wherein the inner edge of the top arcuate portion of the limb has a radius of curvature substantially the same as that of the disc and the solid peripheral portion of the fixed support has a radius substantially greater, whereby the height of said top arcuate portion increases from the middle thereof towards its ends.

4. A disc brake according to claim 1 wherein the rigid frame is formed as a C-shaped stamping with a chordal portion extending parallel to one face of the disc and with two lateral branches extending parallel to the disc axis, all three portions lying in a plane substantially containing the axis of the brake actuator, and the slots provided at the outer edges of the lateral portions of the fixed support limbs being shaped rectangular.

5. A disc brake according to claim 4, wherein the outer edge of said stamping is bent at a substantially right angle along the periphery thereof towards the disc axis.

6. A disc brake according to claim 1, wherein the rigid frame is formed as a C-shaped stamping with a chordal portion extending parallel to one face of the disc and with two lateral branches extending parallel to the disc axis, said lateral branches being inclined with respect to said chordal portion so as to substantially conform with the curvature of the periphery of the disc, and the slots provided at the outer edges of the lateral portions of the fixed support limbs being inclined accordingly.

7. A disc brake according to claim 6, wherein the outer edge of said stamping is bent at a substantially right angle along the periphery thereof towards the disc axis.

8. A disc brake according to claim 7, wherein the frame further includes a second stamping shaped complementary to the first one and having its outer edge symmetrically bent, said second stamping being secured to said first stamping along at least the chordal portion thereof such as by welding their abutting bent edges together.

9. A disc brake according to claim 8, wherein both stampings abut the adjacent friction pad on either side of a plane substantially containing the axis of the brake actuator.

10. A disc brake according to claim 1, wherein said rigid frame is secured to said brake actuator such as by screws or by bolts disposed at connecting points also substantially lying in a plane containing the axis of the brake actuator.

11. A disc brake according to claim 1, wherein a predetermined lateral clearance is left between the lateral branches of the frame and the guiding slots provided at the outer edges of the lateral portions of the fixed support limbs.

12. A disc brake according to claim 1 wherein a leaf spring is inserted between the inner face of the solid peripheral portion of the fixed support and the lateral branches of the frame so as to resiliently engage the latter against the base edge of said guiding slots.

13. A disc brake according to claim 1, wherein a clearance is left between the base arcuate portion of the fixed support limbs and the adjacent arcuate base of the respective friction pads and a leaf spring is inserted therebetween for preventing said friction pads from rattling.

14. A disc brake according to claim 1, wherein the inner edge or edges of the frame chordal portion abutting the adjacent friction pad are formed rectilinear and are encompassed by two recesses allowing for a free movement of the frame relatively to the fixed support despite the increase of stroke of said frame due to the wear of the friction linings.

References Cited

UNITED STATES PATENTS 3,166,158   1/1965   Burnett et al. _____ 188—73
3,245,500   4/1966   Hambling et al. _____ 188—73

MILTON BUCHLER, *Primary Examiner.*

G. E. A. HALVOSA, *Assistant Examiner.*